United States Patent [19]

King

[11] Patent Number: 5,014,891
[45] Date of Patent: May 14, 1991

[54] FISHING AID

[75] Inventor: J. D. King, 151 Darius Ave., Rangely, Colo. 81648

[73] Assignee: J. D. King, Rangely, Colo.

[21] Appl. No.: 522,989

[22] Filed: May 14, 1990

[51] Int. Cl.⁵ .............................................. A01K 97/10
[52] U.S. Cl. ..................................... 224/200; 224/252; 224/253; 224/269; 224/922
[58] Field of Search ................ 224/149, 185, 200, 204, 224/211, 216, 224, 225, 251, 252, 253, 262, 269, 922; 43/21.2

[56] References Cited

U.S. PATENT DOCUMENTS

| | | | |
|---|---|---|---|
| 1,174,319 | 3/1916 | Hipwood | 224/922 X |
| 1,610,344 | 12/1926 | Williams | 224/252 X |
| 2,576,624 | 11/1951 | Miller | 224/922 X |
| 2,817,472 | 12/1957 | Parkhurst | 224/922 X |
| 3,009,612 | 11/1961 | Fischett | 224/922 X |
| 3,286,890 | 11/1966 | Hildebrandt | 224/252 X |
| 4,802,612 | 2/1989 | Anderson | 224/200 X |

Primary Examiner—Henry J. Recla
Assistant Examiner—Robert M. Fetsuga

[57] ABSTRACT

A device for allowing a person with use of only one arm, either right or left member, to operate a fly rod, casting rod, or spinning rod efficiently. The device is equipped with a fishing rod holder and a clamp holder which receives a removable clamp to assist the fisherman by holding the line or fishing tackle.

1 Claim, 2 Drawing Sheets

FISHING AID

BACKGROUND OF THE INVENTION

1. Field of the Invention

The invention relates generally to a manufactured device which is strapped on to the mid section of a fisherman which is capable of holding several styles of fishing rods. The device allows individuals with only one functioning arm, either right or left, to more easily operate a fishing rod. The device firmly holds the rod in place by use of a cylindrical bracket while the fishing tackle is held securely by means of a clamp. Having the rod and tackle separately secured allows the fisherman to use his functioning arm to change tackle, bait the hook, or rest.

2. Description of the Prior Art

Fishing aids of this type are used to assist a person limited to the use of one hand, or who elects to use just one hand to operate a fishing rod. The problem with current aids is that they are made for only one type of rod, they are not adjustable, and they have to be designated either for right or left hand use.

SUMMARY OF THE INVENTION

It is the object of my invention to provide an inexpensive device which allows a person, limited to the use of one hand, either right or left, to efficiently operate most styles of fishing rods, including fly rods, casting rods, or spinning rods. The device is manufactured with a cylindrical bracket to secure the fishing rod and a clamp to hold the line or fishing tackle. With both the rod and line (or tackle) secured the fisherman can use his free hand to bait the hook, change tackle, or rest.

DESCRIPTION OF THE PREFERRED EMBODIMENT

Figure 1:
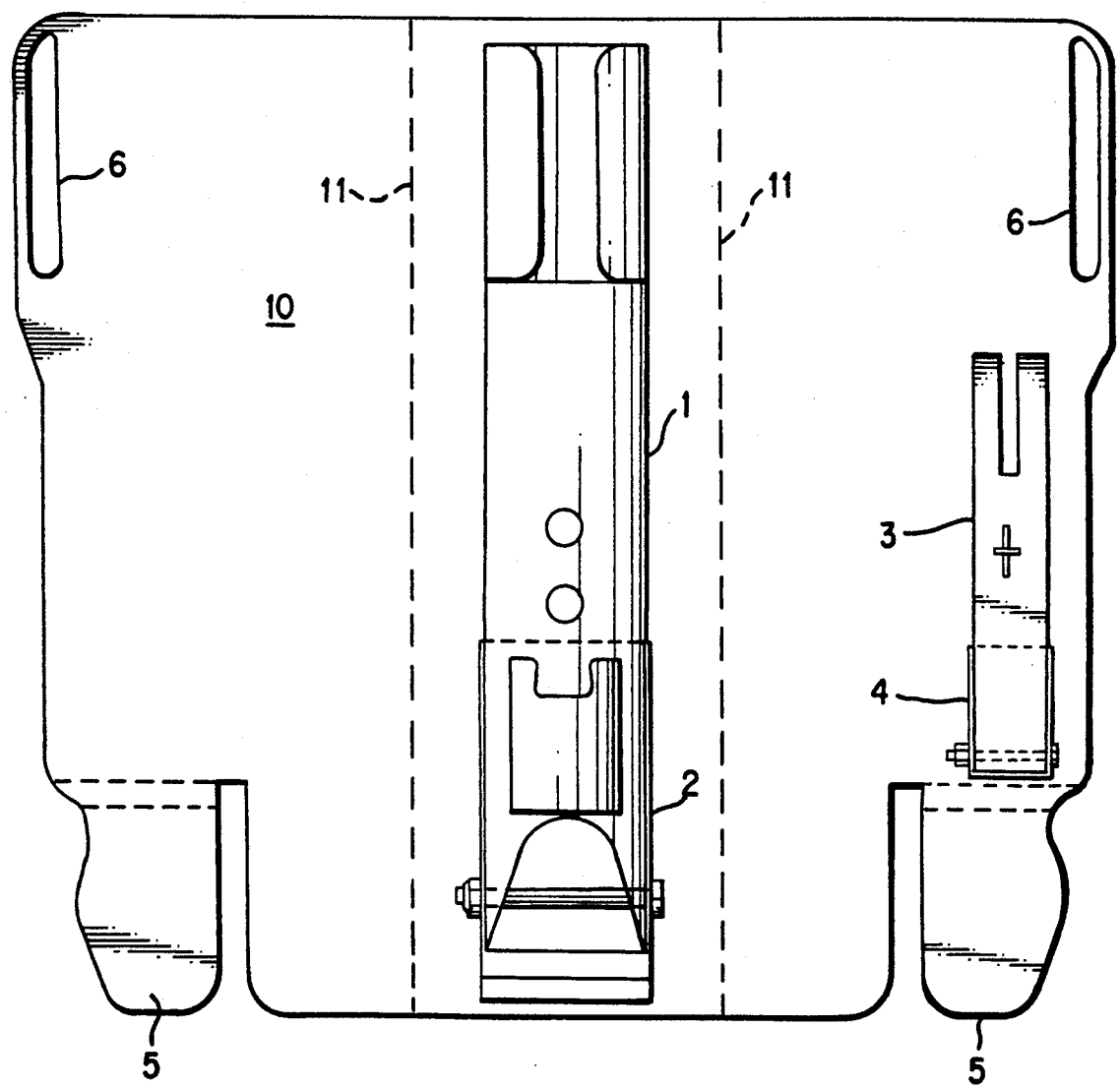
FIG. 1 is a plan view showing the embodiment of the fishing aid.
Figure 2:
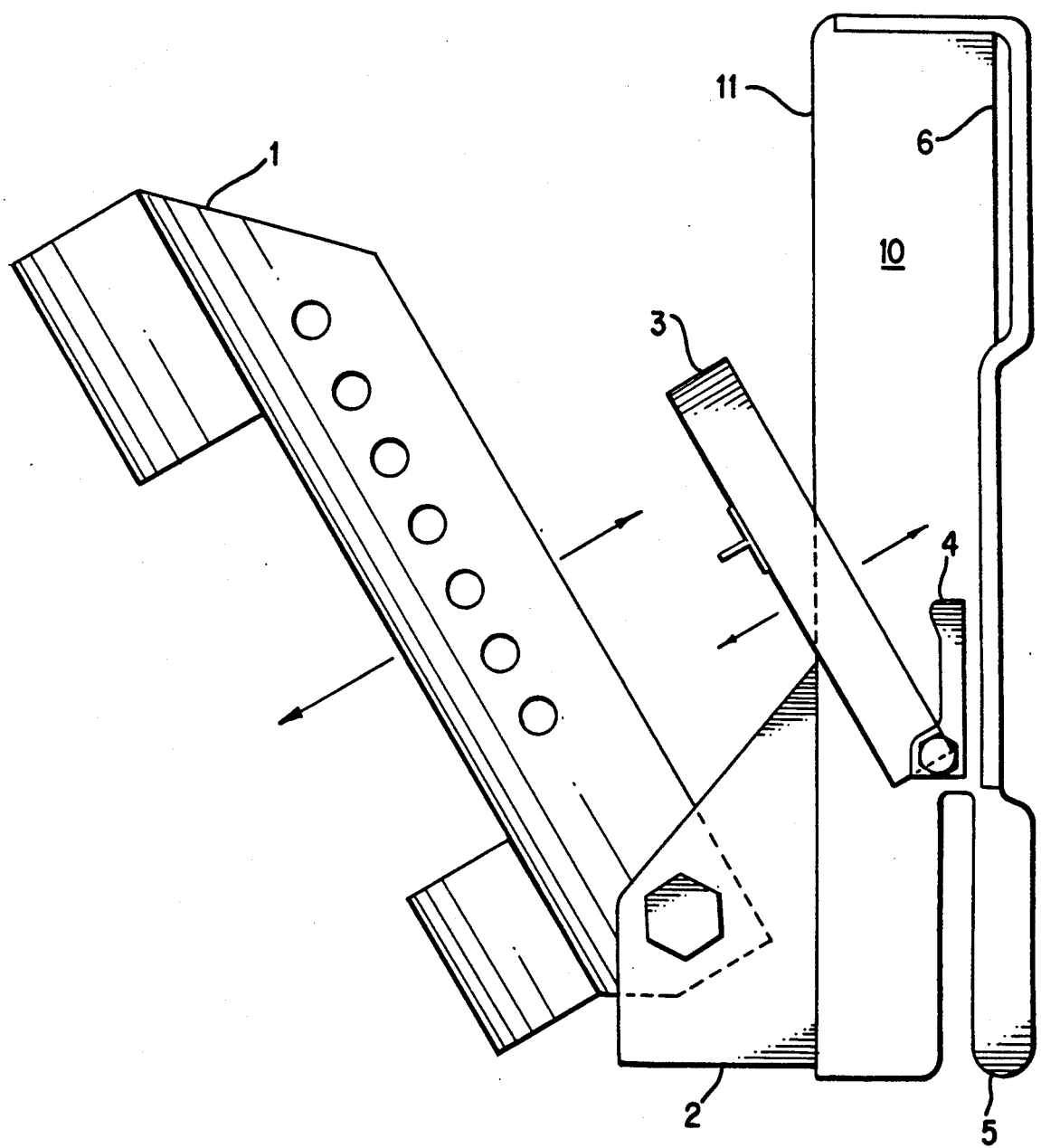
FIG. 2 is a lateral view of the fishing aid which shows the fishing rod holders in the 60° extended position, and the clamp holder in the 90° extended position.

FIG. 1 is a plan view of the fishing aid. It is comprised of a rigid expansion plate 10 which can be contoured to fit the body such as by bends. Attached to the expansion plate are two brackets 2, 4 which hold a fishing rod holder, and a clamp holder 3. A leather belt (not shown) passes through belt loops 6 to hold the device to the fisherman's body. Belt hooks 5 are inserted behind the waistband of a fisherman's pants to keep the device from sliding down.

The fishing rod holder 1 is made of 1 1/16" steel tubing and will hold most styles of fly rods, casting rods, and spinning rods. The fishing rod holder is attached to the expansion plate by a ½"X1½" steel bolt and nut. THe clamp holder 3 is made of 1 3/16" steel tubing and is attached to the expansion plate by a 3/16"X1" steel bolt and nut.

The fishing rod holder 1 can be adjusted from 0° to 60°. The clamp holder 3 can be adjusted from 0° to 90° and is adapted to receive a clamp therein such as the type sold under the trademark VISE-GRIP.

The fishing aid is attached to the fisherman's body by the leather belt (not shown) which passes through the two belt loops 6. The two belt hooks 5 hook on the waistband of the fisherman's pants. The waistband hooks prevent the fishing aid from slipping down. The leather belt keeps the fishing aid in place.

I claim:

1. A fishing aid to be worn by a user, comprising:
    a substantially rectangular rigid plate having front and rear sides with top and bottom side edges, said plate including a pair of spaced slots extending therethrough adjacent said top edge, said slots being adapted to receive a belt to be secured around a user's torso above the waist, said plate further including a pair of downwardly extending tabs connected thereto and spaced from said rear side for receiving a waistband of a user therebetween;
    a fishing rod holder adjustably mounted to the front side of said plate, said fishing rod holder having a substantially tubular portion adapted to receive an end of a fishing rod; and,
    a clamp holder adjustably mounted to the front side of said plate spaced from said fishing rod holer, said clamp holder having a substantially tubular portion adapted to receive a clamp;
    whereby said plate is worn by a user with said belt secured around the torso and with said tabs engaged between the torso and a waistband of the user.

* * * * *